Jan. 14, 1930.  W. J. MURDOCK ET AL  1,743,724
COMBUSTIBLE GAS GENERATOR
Filed May 2, 1925
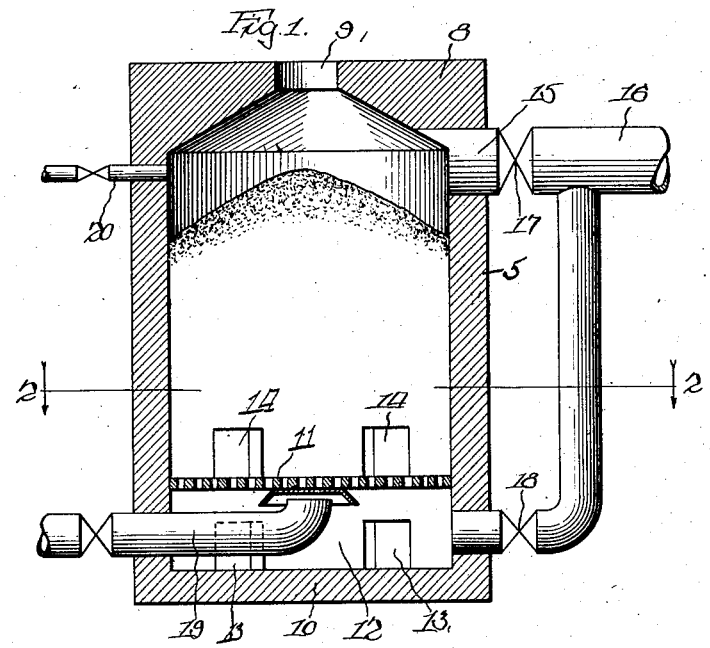
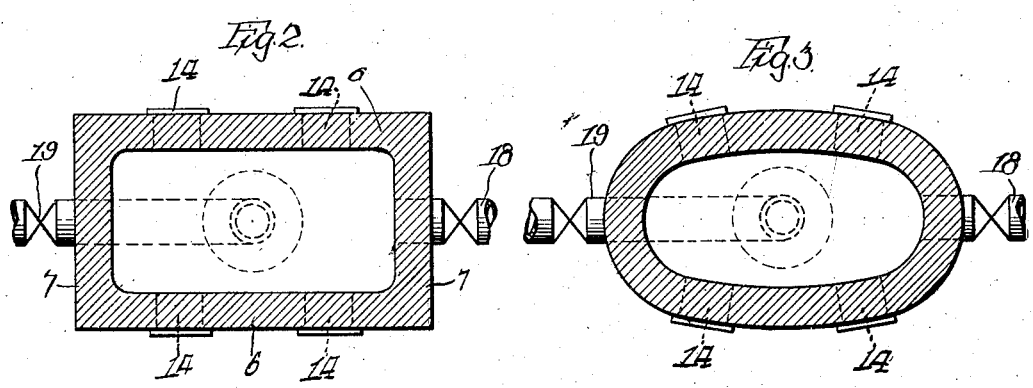
Inventors:
Willis J. Murdock,
Edgar E. Lungren and
Owen B. Evans.
George I. Haight Atty.

UNITED STATES PATENT OFFICE

WILLIS J. MURDOCK, OF JOLIET, AND EDGAR E. LUNGREN, OF AURORA, ILLINOIS, AND OWEN B. EVANS, OF PHILADELPHIA, PENNSYLVANIA, ASSIGNORS, BY MESNE ASSIGNMENTS, TO PIER PROCESS CORPORATION, OF AURORA, ILLINOIS, A CORPORATION OF ILLINOIS

COMBUSTIBLE-GAS GENERATOR

Application filed May 2, 1925. Serial No. 27,402.

This invention relates to improvements in combustible gas generators.

In the manufacture of combustible gas, such as blue or carbureted water gas, or producer gas, from solid fuel, one of the main operations is the blasting which takes place in the generator, by which the bed of fuel is gradually and progressively reduced and heated to incandescence in order to permit the necessary chemical reactions taking place in the generator.

Experience has demonstrated that in cylindrical generators of the size ordinarily used, there is a very noticeable variation in the degrees of permeability of the fuel bed to the passage of the air or steam, or air and steam blasts up through the supporting grate and through the fuel bed, or in the reverse direction, the outer portion of the mass of fuel adjacent the retaining walls of the generator offering a very much less resistance to the passage of the blast therethrough than the central portion or mass, with the result, in actual practice, that the outer portion of the fuel bed for a determinable definite distance from the wall of the generator, becomes activated or what is known as "active area", whereas the central mass of the fuel bed becomes what is known as "inactive area". A generator of this character is handicapped by a large central mass of the fuel which becomes impervious to blasting, and combustion, and remains totally inactive during the operation of the generator, with a consequent great loss in efficiency.

It has been determined in connection with gas producing generators, where the fuel mass during its consumption, is at all times within a determinable definite distance (which is approximately 18 to 24 inches) from the wall of the generator, that a fuel bed so arranged is readily permeable to blasts, and provides a continuous activated incandescent area during the blasting period whereby the water gas reaction may be carried out with the utmost efficiency.

The purpose of this invention is to provide a gas generator for water or producer gas of unlimited capacity, in which the interior of the generator is entirely unobstructed, and in which the retaining walls of the generator are spaced with reference to each other a distance approximately equal to the combined predetermined active combustion areas relative to each wall.

Other and further objects of the invention will more fully and clearly appear from the description and claims hereinafter following.

In the drawings forming a part of this specification, Figure 1 illustrates a more or less diagrammatic view indicating a vertical central section of a generator of the character contemplated by our invention; Figure 2 is a horizontal sectional view of the invention on the line 2—2 of Figure 1; and Figure 3 is a horizontal sectional view similar to Figure 2 of a slightly different embodiment of the invention.

For purposes of illustrating one embodiment of the invention, a water gas generator is indicated in the drawing by the reference numeral 5, such generator including side walls 6, end walls 7, top wall 8 provided with a charging opening 9, and a bottom wall 10. The generator 5 may be provided with a horizontally extending grate 11, which may be of usual construction and disposed above the bottom of the generator proper so as to leave an ash pit 12, from which some of the ashes may be removed through suitable ash pit doors 13. The generator may also be provided with clinker doors above the grate line, said clinker doors being indicated at 14. As is customary in a generator of this character for producing carbureted water gas, the generator is provided with an offtake passage 15, near the top, the gases being conducted through a suitable pipe 16, having the usual interconnected valves 17 and 18.

Blasting provisions are provided and include a combined air and steam conduit 19 which extends into the ash pit of the generator beneath the grate, being adapted to blast the fuel column vertically upward, and such generator is also provided with a blast conduit 20 for blasting the fuel column in a downward direction.

An important feature of the invention lies in positioning the side walls 6 a certain definite distance apart, so as to space the same with reference to each other a distance approximately equal to the combined predetermined active combustion areas relative to each wall, the distance between the inner surfaces of the walls 6 being from three to four feet throughout their longitudinal extent, which corresponds to double the distance of the known active combustion area relative to a retaining or confining wall (from eighteen to twenty four inches inwardly therefrom) causing the zone or area adjacent each side wall 6, to merge one with the other, somewhere in the vicinity of a longitudinally extending vertical central plane which defines the approximate limits of each active combustion area inwardly from the related retaining wall 6. The longitudinal extent of the side walls may be as desired, depending upon the size of the generator, the end walls of the generator being arranged at the extremities of the side walls and connecting the same, the end walls in any event being spaced apart a greater distance than the distance between the walls 6. The walls 6 and 7, also may be of any convenient height, depending upon the size of the generator without affecting the disposition of the combustion areas in their relation to the side walls 6. By this arrangement a generator is provided which may be made of any desired capacity, while retaining the advantageous disposition of the active combustion areas with respect to the confining walls thereof.

In operation, the fuel column occupies the entire cross-sectional area between the confining walls, and rests upon the grate 11. During consumption the fuel column gradually settles toward the grate, and the generator is charged at intervals through the charging opening 9 in the top wall of the same. The fuel body is blasted vertically from end to end, with air and with steam by means of the blasting provisions 19 and 20, and due to the fact that all portions of the fuel body are located within the active combustion area relative to a confining wall, the fuel body is uniformly permeable to blasting throughout its extent, thereby providing a fuel column which during the air blasting operation is rendered incandescent throughout its area, so that the chemical reaction necessary to produce the water gas takes place in all parts of the fuel column, resulting in a great increase in the capacity and output of the generator; the products of such generator being drawn off through the interconnected valves 17 and 18 in the usual manner.

A slightly different embodiment of our invention is illustrated in Figure 3 of the drawing. In this construction all the parts of the generator are of the same character as heretofore described, except for the fact that where desired, the generator may be made oval or elliptical in horizontal cross-section, the walls of the generator defining the extremities of the minor axis of the oval or elliptical formation being spaced from three to four feet apart.

The operation of such a generator would be identically similar to that heretofore described, and retains the various advantages referred to in connection with the generator of rectangular formation hereinbefore referred to.

While we have herein shown and described what we now consider the preferred manner of carrying out our invention, the same is merely illustrative and we contemplate all changes and modifications that come within the scope of the claims appended hereto.

We claim:

1. The herein described improved generator for combustible gas adapted to accommodate a carbonaceous fuel bed, said generator having enclosing walls and a grate defining a substantially unobstructed generating chamber, at least two vertical opposed walls of said generating chamber extending in substantially parallel relation for a distance greater than the distance between them, said parallel walls being spaced apart a predetermined distance dependent upon the sum of the known horizontal widths of the areas of activity of the fuel bed normally contiguous to each of said parallel walls, the horizontal width of each area of activity being known to be not less than 18 inches and not more than 24 inches, said parallel walls providing means spaced apart at any part not less than three feet and not more than four feet and operating to maintain substantially maximum horizontal widths of the active areas relative to each wall in juxtaposed relation and merged substantially at their adjacent extremities between said walls, thereby preserving a substantially maximum total area of fuel bed which can thus be rendered continuously active by the proximity of said parallel walls and preventing formation of inactive fuel bed in said generator; means for subjecting the fuel bed to blasting in one end region, said blast passing through said fuel bed, and discharging at the opposite end region of said fuel bed; and means for taking off the gas as formed, said latter means being positioned adjacent the end region of said fuel bed through which said blast discharges.

2. The herein described improved generator for making water gas, comprising an enclosure adapted to accommodate a carbonaceous fuel bed, said enclosure including elongated, substantially parallel walls and a grate, said substantially parallel walls and the remaining walls of said enclosure defining a continuously unobstructed generating chamber, the fuel bounding surfaces of said parallel walls of said generating chamber being spaced apart a predetermined distance depending upon the sum of the known horizontal widths of the areas of activity of the fuel bed normally contiguous to each of said parallel walls, said parallel walls providing means operating to maintain substantially the maximum horizontal width of active areas relative to each wall in juxtaposed relation and merged substantially at their adjacent extremities between said walls; means for subjecting said fuel body to blasting substantially from one end region through the opposite end region with air; means for subjecting said fuel body to blasting from one end region through the opposite end region with steam; and means adjacent said opposite end regions of said fuel bed for taking off the gas from the generating apparatus.

In witness that we claim the foregoing we have hereunto subscribed our names, WILLIS J. MURDOCK on the 14th day of April, 1925, EDGAR E. LUNGREN on the 13th day of April, 1925, and OWEN B. EVANS on the 29th day of April, 1925.

WILLIS J. MURDOCK.
EDGAR E. LUNGREN.
OWEN B. EVANS.